(12) United States Patent
MacKenzie et al.

(10) Patent No.: US 7,221,383 B2
(45) Date of Patent: May 22, 2007

(54) PRINTER FOR RECORDING ON A MOVING MEDIUM

(75) Inventors: Scott P. MacKenzie, Brockport, NY (US); Nelson A. Blish, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 375 days.

(21) Appl. No.: 10/872,614

(22) Filed: Jun. 21, 2004

(65) Prior Publication Data

US 2005/0280698 A1    Dec. 22, 2005

(51) Int. Cl.
*B41J 2/47* (2006.01)

(52) U.S. Cl. .............. 347/251; 347/253; 347/252; 347/254

(58) Field of Classification Search .......... 347/251, 347/248, 238, 252, 254, 253, 240, 224
See application file for complete search history.

(56) References Cited

U.S. PATENT DOCUMENTS

| 4,806,965 | A | * | 2/1989 | Yamanouchi et al. ......... 355/1 |
| 5,294,942 | A | | 3/1994 | Loewenthal et al. |
| 5,729,277 | A | | 3/1998 | Morrison |
| 5,953,103 | A | | 9/1999 | Nakamura |
| 5,968,719 | A | | 10/1999 | Nakamura |
| 6,037,584 | A | * | 3/2000 | Johnson et al. ............. 250/235 |
| 6,163,363 | A | | 12/2000 | Nelson et al. |
| 6,215,547 | B1 | | 4/2001 | Ramanujan et al. |
| 6,438,231 | B1 | | 8/2002 | Rhoads |
| 2003/0012569 | A1 | | 1/2003 | Lowe et al. |

* cited by examiner

*Primary Examiner*—Lamson Nguyen
*Assistant Examiner*—Sarah Al-Hashimi
(74) *Attorney, Agent, or Firm*—Nelson Adrian Blish

(57) ABSTRACT

A method for forming a pixel (20) having a predetermined density onto a sensitized recording medium moving in a length direction energizes a pixel exposure source (14) to begin exposure at the leading edge (34) of a pixel (20) and for a first predetermined time interval. The pixel exposure source (14) is de-energized for a period depending on the predetermined density and on media transport speed, then re-energized at the termination of the period. The pixel exposure source (14) is then de-energized at the end of a second predetermined time interval to terminate exposure at the trailing edge (36) of the pixel (20), whereby spatial dimensions of each pixel (20) are maintained at variable transport speed or density of pixel (20).

9 Claims, 13 Drawing Sheets

PRINTER FOR RECORDING ON A MOVING MEDIUM

CROSS REFERENCE TO RELATED APPLICATIONS

Reference is made to the following commonly-assigned copending U.S. patent application Ser. No. 10/840,481, filed May 6, 2004, entitled TWO-STAGE EXPOSURE DEVICE FOR WATERMARKING FILM, by Zolla et al., the disclosure of which is incorporated herein.

FIELD OF THE INVENTION

This invention generally relates to pixel recording apparatus and methods and more particularly relates to an apparatus and method for recording pixels onto a photosensitive medium that is moving at a variable rate.

BACKGROUND OF THE INVENTION

Various types of apparatus have been developed or proposed for recording a pattern of pixels onto a photosensitive medium, using various types of light sources including LEDs and lasers. In the conventional model, image content is recorded onto photosensitive media, such as photosensitive film or paper, a full frame at a time. A number of pixel-based digital imaging apparatus follow this traditional model by modulating a full frame of pixels at one time for exposure of the image content. For example, various types of two-dimensional spatial light modulators, such as liquid crystal devices (LCDs) or digital micromirror devices (DMDs) can be used to provide a complete frame of image data for exposure.

As just one example, commonly-assigned U.S. Pat. No. 6,215,547 (Ramanujan et al.) discloses a writing apparatus employing a reflective LCD spatial light modulator for providing modulated light for exposure of a photosensitive medium, one image frame at a time.

In applying this conventional frame-based imaging model, the photosensitive medium is moved or indexed into position within an exposure apparatus and is then maintained in a stationary position during exposure of the pixel pattern within the image frame. The job of exposing successive pixel image frames onto a length of photosensitive medium requires successive steps for moving and stopping the media to record each frame.

It can be appreciated that constant starting and stopping of media movement has a number of drawbacks, particularly with respect to throughput and to the overall mechanical complexity of the film transport system. In response to the need for improved efficiency, a number of alternatives have been proposed.

For example:
U.S. Pat. No. 6,163,363 (Nelson et al.) discloses a DMD spatial light modulator used to expose an image onto a continuously moving photosensitive medium, one or more lines of pixels at a time.
Similarly, U.S. Pat. No. 5,953,103 (Nakamura) discloses a color printer using an array of modulated light sources that records four lines of pixels at a time by progressively indexing the media past a stationary printhead.
U.S. Pat. No. 5,968,719 (Nakamura) discloses a side printer for printing bar codes and other information onto a section of filmstrip media during processing.

While the above-listed patents describe methods for writing one or more lines of pixels onto moving photosensitive media, these methods are limited to applications in which the photosensitive medium moves through the exposure region at a relatively constant speed. There is a need to print digital watermark images onto motion picture photosensitive medium while the photosensitive medium is in motion. Such would be the situation in the manufacturing process of the motion picture photosensitive medium where forming latent watermarks images on the photosensitive medium would be done while the photosensitive medium was moving at high speeds. The prior art methods listed above would not be readily suitable for applications in which the photosensitive medium moves at variable speeds.

Addressing the problem of writing pixels at variable media speed, commonly-assigned U.S. Pat. No. 5,294,942 (Loewenthal et al.) discloses an apparatus for forming a pixel pattern, one line of pixels at a time, onto a medium that is moving at a variable rate. The apparatus of U.S. Pat. No. 5,294,942 tracks the speed of the moving photosensitive medium and adapts its pixel exposure timing, based on speed tracking results, to obtain a uniform exposure. The method and apparatus of U.S. Pat. No. 5,294,942 thus provides a more flexible solution for obtaining uniform exposure levels for recording pixels. For example, a pattern of pixels can be recorded on the leading or trailing end of a film roll without requiring that the film be moving through an exposure region at a constant speed.

However, while methods described in U.S. Pat. No. 5,294,942 and in related prior art enable the recording of a pixel pattern onto a continuously moving medium in line-by-line fashion, high-speed manufacturing and film processing environments can impose even further requirements. One area of particular concern relates to forming a latent image watermark onto a photosensitive medium during manufacture of the medium.

For example, as is disclosed in U.S. Patent Application 2003/0012569 (Lowe et al.), a latent watermark image can be exposed onto the "raw" photosensitive medium itself, at the time of manufacture. Then, when the medium is exposed with image content, the image frame is effectively overlaid onto the watermark pattern. Such a method is also disclosed in U.S. Pat. No. 6,438,231 (Rhoads). The Rhoads '231 patent discloses this type of pre-exposure of the watermark onto the film emulsion within the frame area of negative film, for example.

It can be appreciated that watermark pre-exposure would have advantages for marking motion picture film at the time of manufacture or prior to exposure with image content. A length of motion picture film could be pre-exposed with unique identifying information, encoded in latent fashion, that could be used for forensic tracking of an illegal copy made from this same length of film. However, prior art watermarking techniques proposed for photosensitive media in general fall short of what is needed for motion picture watermarking, particularly watermarking during high-speed film manufacture. Problems that make it difficult or impractical to use conventional watermark application techniques for pre-exposure of film in manufacture relate to both throughput requirements and image quality. Among the problems with watermark application in high-speed manufacturing environments are the difficulty of exposure control, not only for maintaining a uniform exposure, but for modulating exposure to produce a watermark pixel pattern having a selectable number of grayscale levels. Another problem, not a factor during pixel-wise exposure at lower speeds, relates to pixel shape. That is, with the photosensitive medium moving at high speeds during pixel recording, there can be a significant amount of pixel elongation in the travel direction, visible as "smear." Unfortunately, the amount of pixel smear varies with the speed of media travel, effectively changing the dimensions of the pixel depending on the specific rate of speed of the media past the exposure source.

Referring to FIG. 1A, there is represented how a pixel 10 is recorded onto a photosensitive medium 12 by a pixel exposure source 14 when photosensitive medium 12 is stationary. (FIG. 1A elements are not to scale, but are represented to show the overall concept.) The exposure light beam from pixel exposure source 14 has a uniform power output density W (typically expressed in Watts/cm$^2$). This exposure level is enabled for a period of time (t), or exposure time, to create a density (D) where D=log H. As is well known in the imaging arts, exposure (H) is a function expressed in general terms as H=W–t. The overall shape of pixel 10 resembles the output shape of pixel exposure source 14; a circular output aperture of pixel exposure source 14 yields a substantially circular pixel 10. In FIG. 1A, pixel exposure source 14 has an output diameter of some arbitrary pixel size, depending on the application. Since pixel dimensions can vary over a range, the pixel diameter is simply considered as a normalized "pixel unit" in the description that follows. With reference to FIG. 1A, latent image pixel 10 formed by exposure is 1 pixel unit in diameter and has a density level, D. As shown in FIG. 1B, a density profile 32 in the direction along the length of the medium through the center of the pixel has a uniform density profile 32, so that density D is fairly consistent across pixel 10.

In contrast with FIG. 1A, FIG. 2A shows how an elongated pixel 20 is formed when photosensitive medium 12 is moving, in the direction of the arrow. Again, FIG. 2A is not to scale, but is sized for comparison with FIG. 1A. For example, photosensitive medium 12 is transported in a length direction, termed its travel direction, at a velocity of V mm/t, during exposure time t. The resulting exposure on photosensitive medium 12 forms an elliptical pixel 20 with a dimension that is a factor of 1 pixel unit times V velocity. The elongated or elliptical shape of pixel 20, also termed "smearing," is caused by the movement of photosensitive medium 12 while pixel 20 is exposed. A density profile 32a through the center of pixel 20 shows non-uniform density, as is shown in FIG. 2B. This non-uniformity of density occurs since the middle third of the mid section receives light for the full exposure time t while leading and trailing portions of pixel 20 receive light for a shorter time, which can be considered as the integrated time t/2.

FIGS. 3A and 3B show a representative portion of a pixel pattern where photosensitive medium 12 is held stationary and where moving, respectively. Different shading is used to indicate that each individual pixel 10, 20 is also assigned a density level D. By comparing FIGS. 3A and 3B, it is readily seen that different pixel 10, 20 shapes result, depending on whether or not photosensitive medium 12 is moving. Pixels 20 also exhibit a different density profile 32a depending on speed. Moreover, both the shape of pixel 20 in the travel direction and its density profile 32a will vary depending on the transport speed of photosensitive medium 12. Thus, the change in pixel 20 shape and density profile 32a with transport speed complicates the task of forming latent indicia of any type onto photosensitive medium 12. In addition, variation in pixel 20 shape and density profile 32a also make it difficult to modulate the relative density of pixel 20 to allow encoding of information corresponding to pixel 20 density.

Where the speed of photosensitive medium 12 is fairly slow, the actual effect of pixel 20 smearing, as represented in FIG. 2A, is negligible. That is, the exposure time is so short that the basic response represented in FIG. 1A occurs for slow moving photosensitive medium 12. On the other hand, the faster the speed of photosensitive medium 12, the more pronounced is the elongation of pixel 20. It can be appreciated by those skilled in the imaging arts that forming pixels 20 at very high film speeds can result in considerable distortion of pixel 20. It can be difficult to control both the shape and the effective density of pixel 20, particularly if the rate of photosensitive medium 12 speed changes. For instance, at the beginning or near the end of a spool of a film medium, the necessary acceleration or deceleration of the film medium would cause pixels 20 to have different dimensions relative to their dimensions at portions of the film medium when printed at full speed. Moreover, any attempt to control the density level of pixels 20 recorded at various media transport speeds would be particularly difficult using existing exposure timing techniques. Thus, it would be very difficult to record, in high-speed film manufacture or processing, a pattern of pixels 20 having consistent shape and having controllable effective density over all portions of a length of photosensitive medium 12.

FIGS. 3B and 3C show the elongated nature of pixels 20 and show how some amount of overlap can occur between adjacent pixels 20 in the length direction. FIG. 3B shows the spatial outlines of pixels 20 in dotted line form, with only two pixels 20 represented to show non-uniform density profiles 32a, corresponding to two pixels 10 in FIG. 3A. The overlap area between pixels 20 may effectively receive exposure for two pixels 20; however, the effect on density in this overlap area has been shown to be minimal, due to response characteristics of the media. FIG. 3C shows the inter-pixel timing in more detail, with a preferred timing of encoder pulses 28, as described subsequently, and resulting density profiles 32a for each successive pixel 20 in the length direction. The combined effect of the applied exposure is shown as a pixel-to-pixel additive density profile 44. Again, the additive density profile 44 shown in FIG. 3C is a first approximation; response characteristics of the media are a key factor in determining the effects of successive applications of exposure energy from different exposure sources in the overlap area of pixels 20.

From an imaging perspective, properties of a watermark image or other indicia may need to meet high levels of quality. For example, complex watermark extraction methods may require that certain properties of watermark pixels be maintained in order to allow successful extraction of the encoded information. Pixel size and density are among key properties for this purpose. Thus, there is a need for methods of forming pixel patterns for watermarks and other latent indicia on photosensitive media, where the method compensates for acceleration/deceleration of the moving medium.

SUMMARY OF THE INVENTION

It is an object of the present invention to provide an apparatus and method for recording a pattern of pixels onto a medium where pixel dimensions and densities are well controlled, regardless of the speed of the photosensitive medium during pixel exposure. With this object in mind, the present invention provides a method for forming a pixel having a predetermined density onto a sensitized recording medium moving in a length direction comprising:

(a) energizing a pixel exposure source to begin exposure at the leading edge of a pixel and for a first predetermined time interval;

(b) de-energizing the pixel exposure source for a period depending on the predetermined density and on media transport speed;

(c) re-energizing the pixel exposure source at the termination of the period;

(d) de-energizing the pixel exposure source at the end of a second predetermined time interval to terminate exposure substantially at the trailing edge of the pixel; and such that steps (a)–(d) are executed in sequence over the length of a single pixel.

From another aspect, the present invention provides a method for forming a pixel of a predetermined density by applying an exposure energy onto a photosensitive medium moving in a length direction comprising:

(a) determining the pixel length from a leading edge of the pixel to a trailing edge of the pixel according to exposure, over an exposure interval, at maximum speed;

(b) defining a leading edge initiation time by associating the leading edge of the pixel to the timing of a positional signal from a feedback apparatus that is coupled with a media transport system;

(c) calculating an anticipated trailing edge termination time by associating a trailing edge of the pixel to the timing of the positional signal from the feedback apparatus coupled with the media transport system;

(d) initiating a first exposure pulse at the leading edge initiation time and applying the first exposure pulse for a first time period according to the predetermined density; and (e) initiating a second exposure pulse after a delay period following termination of the first exposure pulse, such that the second exposure pulse terminates at the anticipated trailing edge termination time.

It is a feature of the present invention that it provides an apparatus capable of adapting pixel exposure to the transport speed of a photosensitive medium for maintaining dimensional and density control.

It is an advantage of the present invention that it controls the timing, rather than the overall intensity level, of the exposure sources used for pixel recording.

It is a further advantage of the present invention that it provides a consistent pixel recording apparatus and method, providing a robust image or other pixel pattern that is consistent within any portion of a length of media.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The term "indicia" (singular: indicium) as used in the present application comprises any type of discriminating mark, including the full range of pixel patterns that can be recorded onto photosensitive media. In broadest terms, the pixel recording apparatus and method of the present invention could be applied for recording image scene content, in pixel form, as latent indicia. Other types of latent indicia include watermarks, time stamps, batch identifiers, and other types of pixel patterns that would be useful to the manufacturer, processor, or end user of film and other sensitized media. These latent pixel patterns are typically within the image area of the sensitized media; however, latent indicia could alternately be formed along borders or edges of the media, wholly or partially outside the image area.

Apparatus

Figure 4:
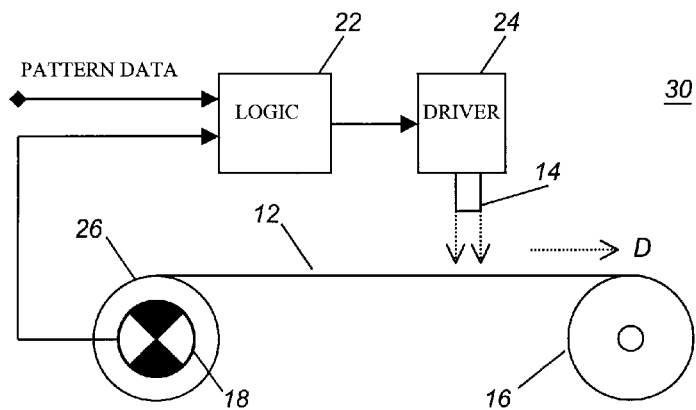
FIG. 4 is a block diagram showing the basic components of a pixel forming apparatus.

Referring to FIG. 4, there is shown, in block diagram form, the basic arrangement of components used in a pixel recording apparatus 30 of the present invention. A media transport apparatus 16 transports photosensitive medium 12, which is typically fed from a roll 26, past pixel exposure sources 14. Pixel exposure sources 14 are typically arranged as a linear array of light sources, such as LEDs, and include any necessary lenses or other supporting optical components. An encoder 18 is coupled to media transport apparatus 16 for determining speed and position of photosensitive medium 12. Encoder 18 provides this feedback to a control logic processor 22 that controls a driver 24 for each pixel exposure source 14. Control logic processor 22 is some type of logic processor that provides driver 24 timing logic and other functions. In one embodiment, control logic processor 22 uses a dedicated microprocessor; other embodiments could include a computer workstation or other computing platform with appropriate software for modulating pixel exposure sources 14 according to timing and positional feedback signals and to image data for the pixel pattern to be recorded.

Encoder 18 provides information about the angular displacement of a rotating device such as a spool or drum. As is well known in the film handling arts, the diameter of the rotating device and the linear distance traversed at the surface of the device is proportional to its angular displacement. A sufficiently high-resolution encoder 18 would be used such that the placement of the pixel pattern can be aligned to perforations, notches, or other film features if required. Encoder 18 provides linear distance information used to dynamically adjust the effective exposure level and exposure time for pixel 20 formation, as described subsequently.

Determining Media Transport Speed

Figure 5:
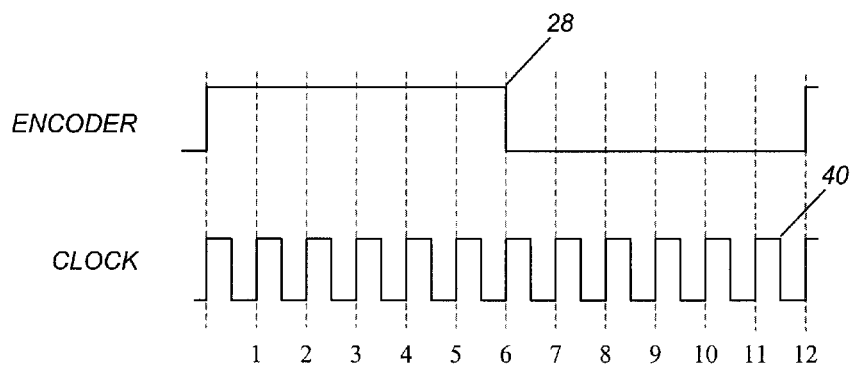
FIG. 5 is a timing chart showing the relationship of encoder pulses to clock pulses.

Referring to FIG. 5, there is shown a relationship of encoder pulses (ENC) 28 to clock cycles (CLK) 40. CLK cycles 40, typically generated from a crystal oscillator or other accurate frequency-generating componentry, provide a timing reference. ENC pulses 28 provide information on position of photosensitive medium 12. Thus, as is well known to those skilled in positioning mechanisms, dividing the distance information provided from ENC pulses 28 by the timing information provided from CLK cycles 40 gives the travel speed of photosensitive medium 12 along travel direction D.

Determining Pixel 20 Dimensions

Figure 1A:
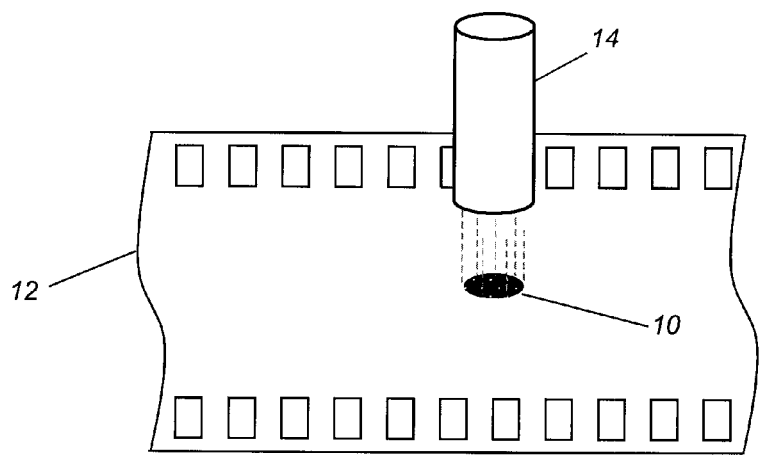
FIG. 1A is a perspective view showing the conventional method of forming a pixel onto a stationary photosensitive medium.
Figure 1B:
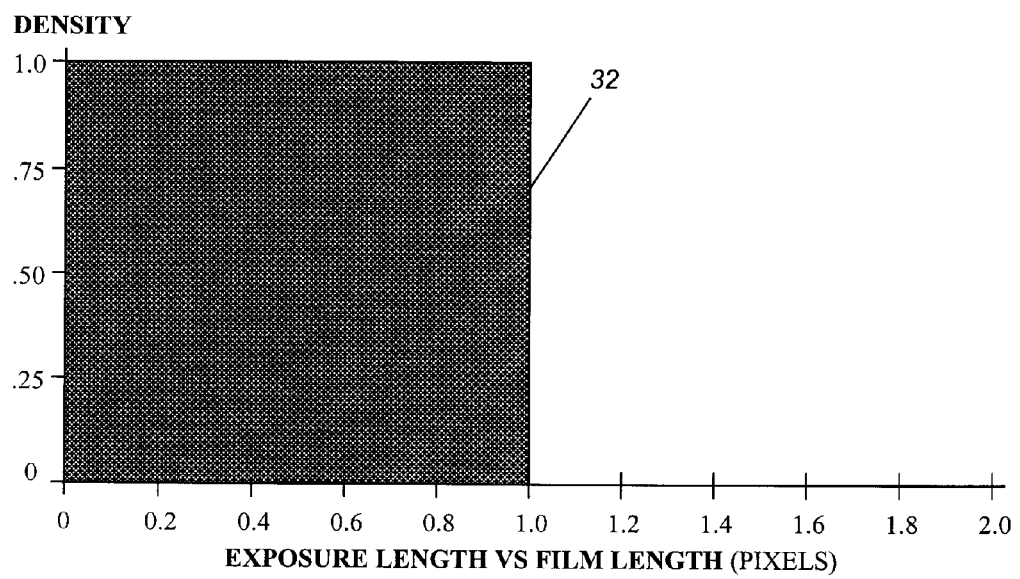
FIG. 1B is a graph showing a density profile for the conventional pixel formed onto a stationary medium.
Figure 2A:
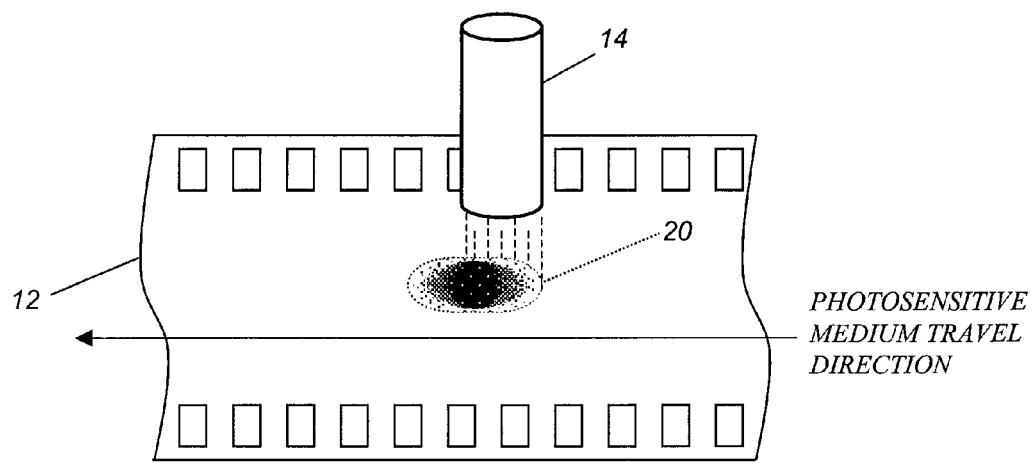
FIG. 2A is a perspective view showing how a pixel is formed onto a moving photosensitive medium.
Figure 2B:
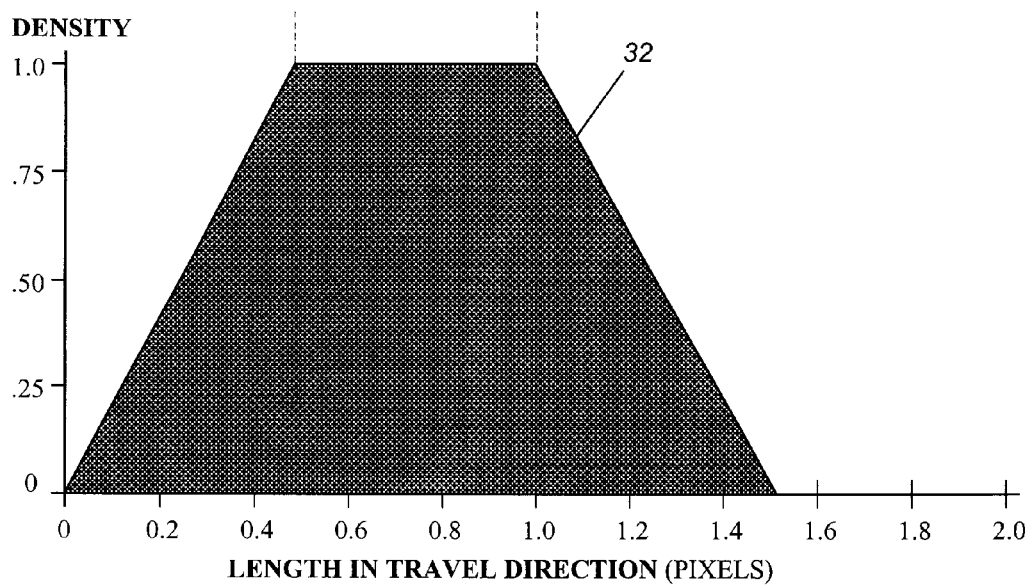
FIG. 2B is a graph showing a density profile for the pixel formed on a moving medium.
Figure 3A:
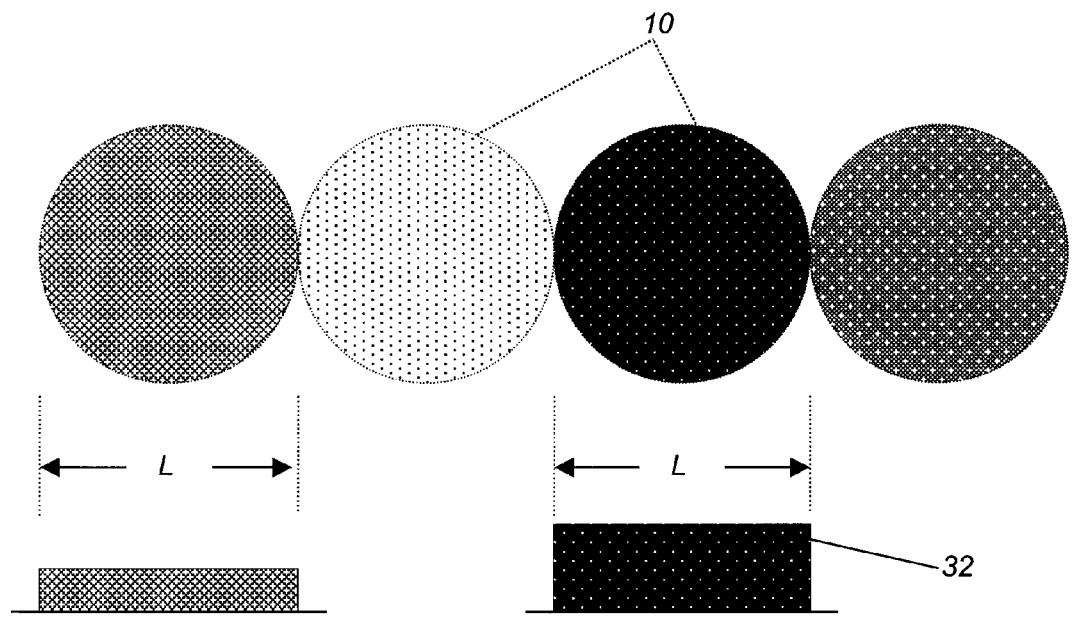
FIG. 3A is a top view of an array of pixels formed in the conventional manner.

The goal of the apparatus and method of the present invention is to provide a mechanism for forming latent indicia onto a moving medium, wherein pixels 20 formed in the pixel pattern have consistent shape and density profile 32a characteristics, regardless of media transport speed. As was shown in the examples of FIGS. 2A and 3B, pixels 20 formed during movement of photosensitive medium 12 are elongated, having a leading edge 34 and a trailing edge 36, which bound the central area having concentrated density and a portion of smear area. Since the goal of the present invention is to provide pixels 20 of equal dimension regardless of the speed of photosensitive medium 12, it is necessary to use, as a baseline condition, the worst-case dimensions for pixel 20, that is, the length dimension L' of pixel 20 when formed at the highest transport speed. This dimension then dictates the exposure timing for all transport speeds less than the maximum. (Note that in FIG. 3B, pixels 20 are exaggerated in dimension, for the sake of description and to contrast the shape and density profile of elongated pixels 20, exposed onto a moving medium, from conventional pixels 10 exposed onto a stationary medium as in FIG. 3A. In practice, center-to-center spacing for elongated pixels 20 would be the same as center-to-center pixel spacing for conventional pixels 10.)

Referring back to FIG. 5, it can be observed that length L' of pixel 20 is related proportionally to some distance measurement obtained from encoder pulse 28. That is, the time interval for exposure of a certain length of moving photosensitive medium 12 can be related to some number of encoder pulses 28. To simplify the discussion that follows, pixel 20 length L' is written during one half-cycle of encoder pulse 28. (In actual practice, pixel 20 length L' may be written during some multiple or fraction of encoder pulse 28; what is important is to observe that there is some synchronization between ENC pulses 28 and pixel-forming pulses.)

Figure 6:
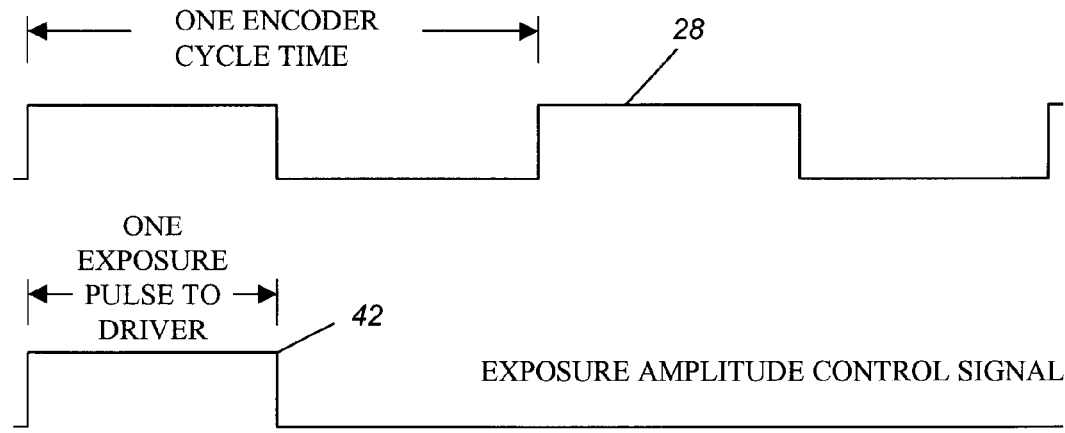
FIG. 6 is a graph showing the relationship of the exposure drive pulse to density for one encoder pulse.
Figure 6:
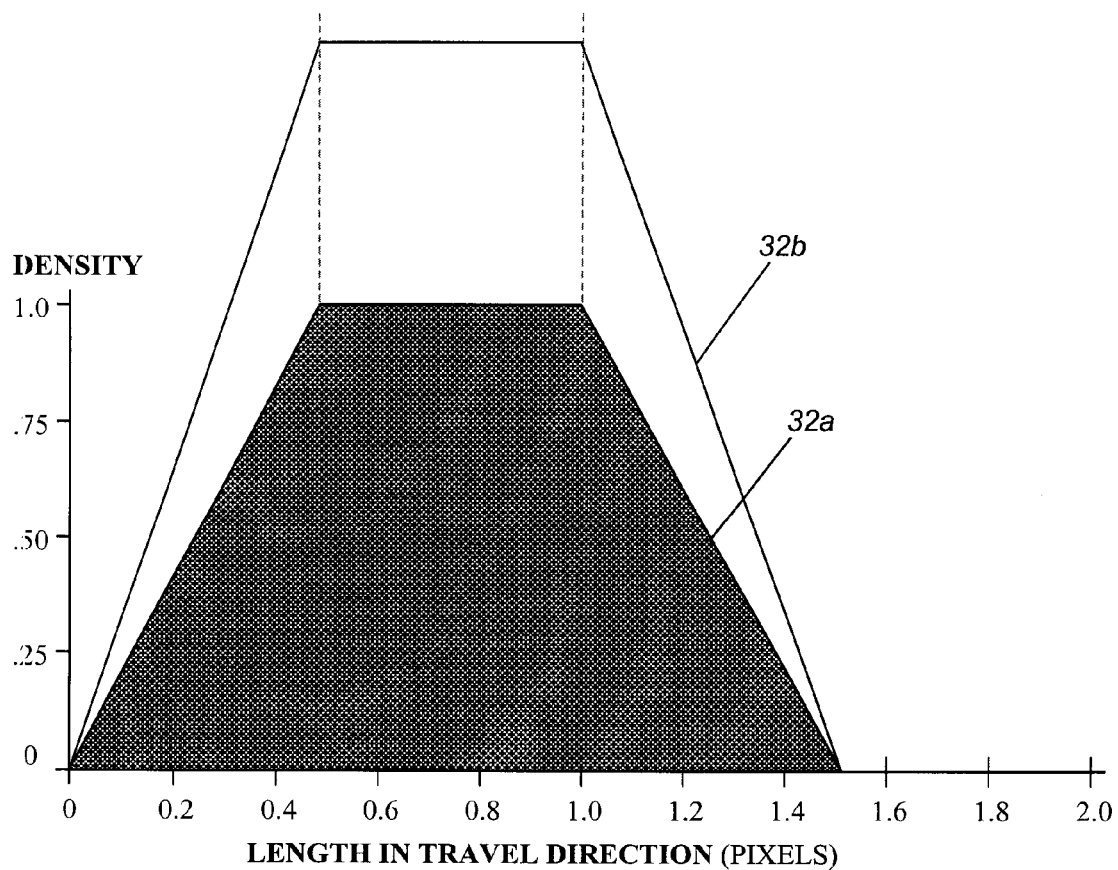

FIG. 6 shows the relationship of exposure timing to density, where an exposure pulse 42 has the duration of one half of one encoder pulse 28, as shown. For this example, normalized density for a maximum media transport speed is expressed as 1.0. At this maximum speed, pixels 20 are formed with a 50% smear condition, as was represented in FIG. 3C. Density profile 32a shows the maximum speed condition. Exposure begins when ENC pulse 28 goes high. The exposure source remains energized until encoder ENC pulse 28 goes low. The resulting exposure yields a smeared pixel 20 with non-uniform density profile 32a, over the 1.5 pixel length shown. This profile then sets a baseline for the desired density to be obtained at any speed.

Decreasing media transport speed results in an increase in density above the normalized 1.0 value, as shown by a second density profile 32b in the graph of FIG. 6. Thus, in order to provide an equivalent 1.0 density exposure at lower speed, the applied exposure energy must be reduced.

One possible tactic for control of density is to dynamically vary the exposure level using amplitude modulation. However, as can be well appreciated, this requires dynamic modulation of the exposure intensity of pixel exposure source 14 in order to adapt to changing media transport speeds. It is readily recognized that dynamic control of this analog value would be difficult to achieve in practice.

An alternate approach is to adjust exposure pulse 42 timing using pulse-width modulation, PWM. With this method, the duration of exposure pulses 42 would be adjusted to provide a suitable amount of exposure energy based on media transport speed. PWM techniques could be employed to control pixel 20 density. However, this solves only part of the problem. With reference to FIG. 6, it has been shown that density profile 32a adds an amount of smear to the shape of pixel 20. Thus, any solution for writing onto a moving medium must provide both control of pixel 20 density and control of pixel 20 shape. This added requirement for maintaining pixel 20 dimensions along with exposure control calls for an innovative approach to PWM timing.

Control of PWM Timing

Figure 7:
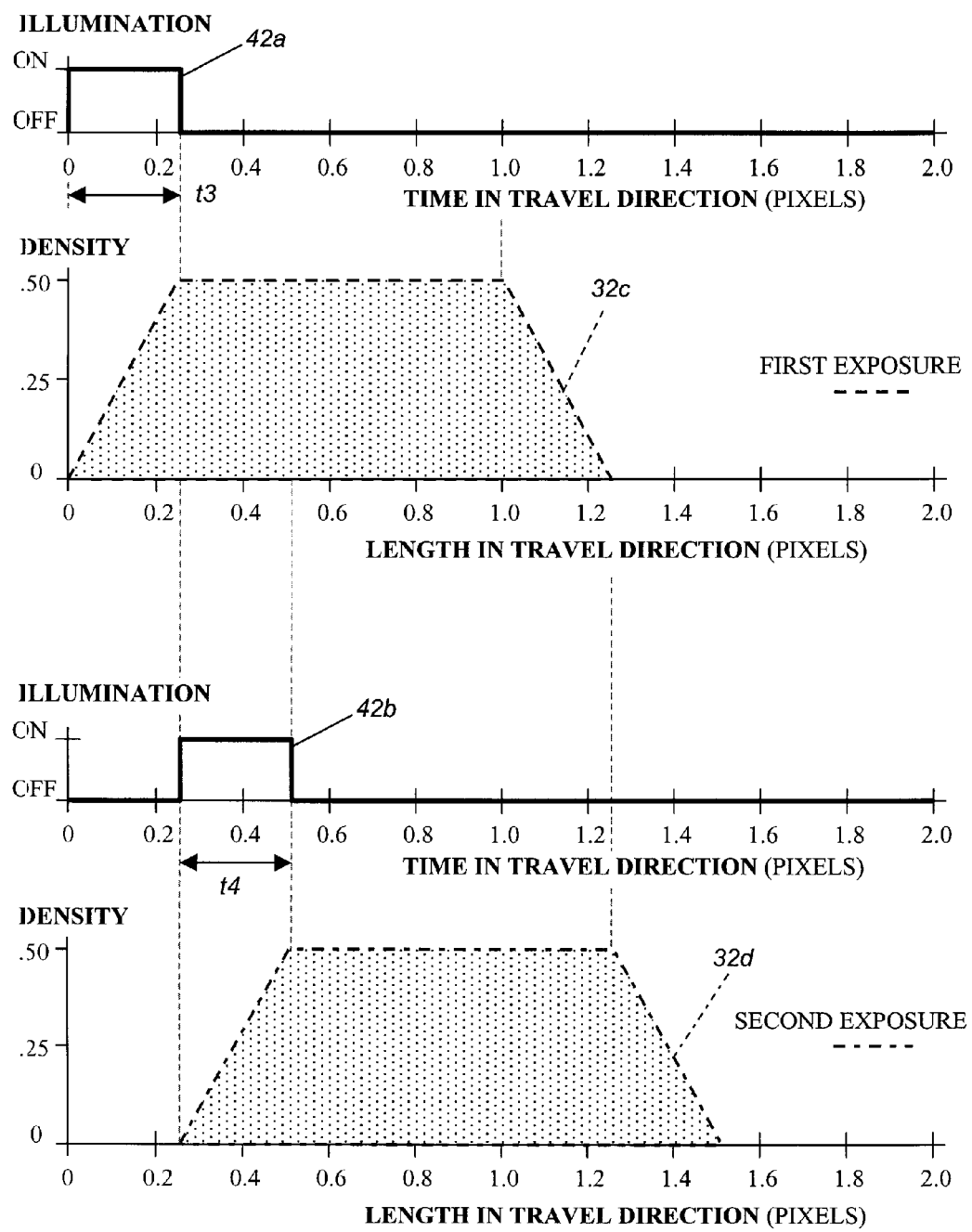
FIG. 7 is a graph showing a timing sequence used and the resultant exposure densities for each pulse of the dual-pulse modulation according to the present invention.
Figure 8:
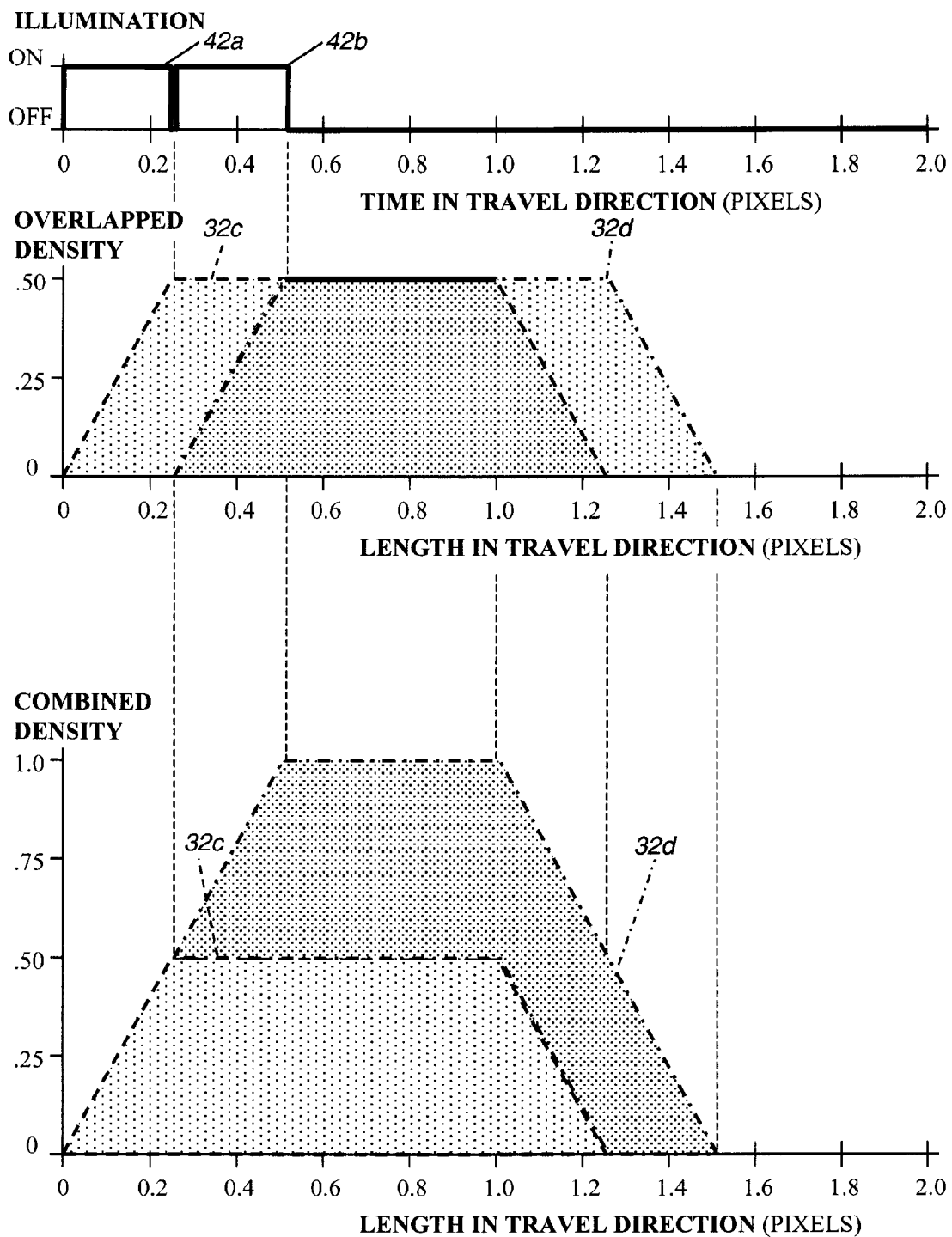
FIG. 8 is a graph showing relative relationship of the individual dual-pulse modulation exposure densities and their combination.

Given that exposure is a factor of intensity multiplied by time, base-case conditions for exposure onto moving media occur where media transport speed is highest. Referring to FIGS. 7 and 8, there is given a first example showing the use of pulse width modulation for controlling both exposure energy level and duration. A first exposure pulse 42a, initiated at time 0 and ending approximately at time 0.25, generates a density profile 32c. Exposure pulse 42a provides sufficient exposure for obtaining a density level of 0.5 over a pixel length of about 1.25 pixel units dimension. A second exposure pulse 42b, initiated at time 0.25 and ending approximately at time 0.5, generates a density profile 32*d*. Exposure pulse 42*b* similarly provides sufficient exposure for obtaining a density level of 0.5 over a pixel length of about 1.25 pixel units dimension. As is shown along the length axes in FIG. 7, density profile 32*d* spatially trails density profile 32*c*. FIG. 8 shows the combined temporal pulses 42*a* and 42*b* and their resultant effect on density profiles 32*c* and 32*d* whose densities overlap over an area of travel from 0.25 to 1.25 pixel units. On the photosensitive medium, density profiles 32*c* and 32*d*, timed differently as shown in FIG. 7, are additive, providing the 1.0 density profile indicated in combined density profile 32*d* of FIG. 8. In this way, the baseline density profile 32*a* of FIG. 6, obtained at the maximum media transport speed, can be achieved using a timed pair of exposure pulses 42*a* and 42*b*.

From the example of FIGS. 7 and 8, it can clearly be seen that lesser densities than 1.0 can be obtained by applying exposure pulses 42*a*, 42*b* of shorter duration. However, it must again be emphasized that the same pixel 20 length dimensions must be maintained for any density. Thus, the timing of exposure pulses 42*a* and 42*b*, and the duration of the variable interval between them, must be closely controlled for generating pixel 20 having suitable density and length dimensions.

Figure 9:
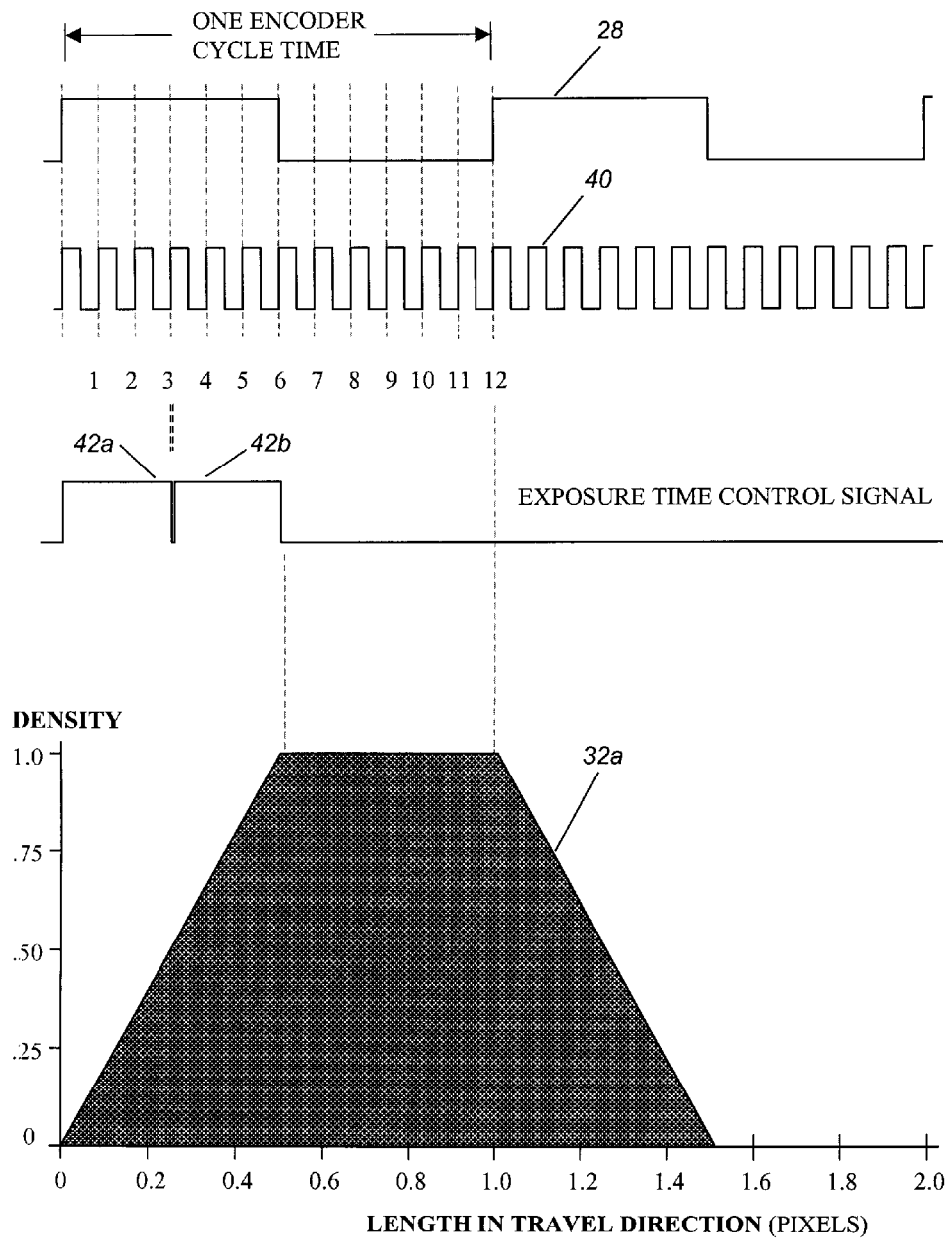
FIG. 9 is graph showing relative relationships of positioning, timing, and exposure signals for obtaining a desired density profile at one speed.

Referring now to FIG. 9, the timing of exposure pulses 42*a* and 42*b* is represented relative to encoder pulse 28 and CLK cycle 40. Notably, first exposure pulse 42*a* begins at the beginning of an encoder cycle, where the encoder 18 half-cycle is synchronous with the spatial location of pixel 20 placement. Second exposure pulse 42*b* ends at the half-cycle of encoder pulse 28. FIG. 9 represents the base-case, that is, the highest density (normalized to 1.0 as in the previous example of FIGS. 6–8) at the maximum media transport speed. Thus, second exposure pulse 42*b* follows first exposure pulse 42*a* almost immediately, substantially providing exposure energy during the complete half-cycle of encoder pulse 28.

Figure 10A:
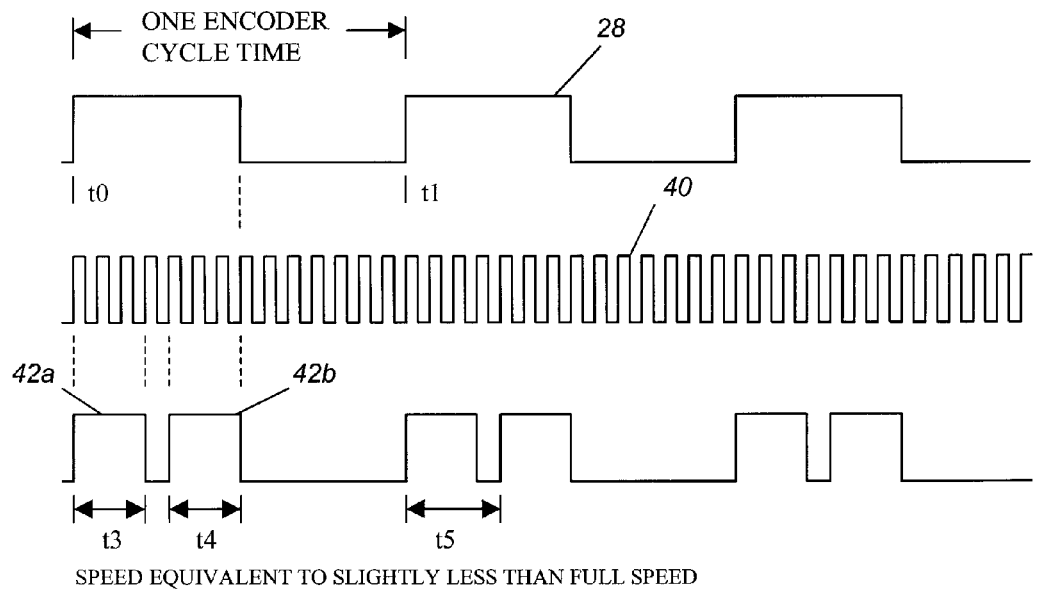
FIGS. 10A and 10B are graphs showing the relative timing of encoder and driver signals for different media transport speeds.
Figure 10B:
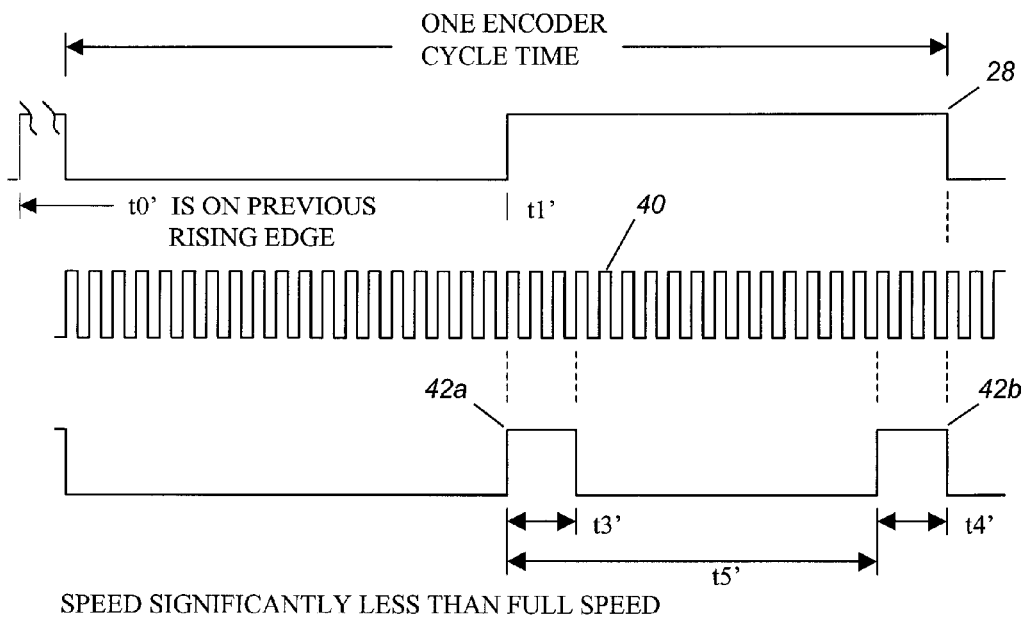

FIGS. 10A and 10B show, for comparison, the relative timing of first and second exposure pulses 42*a* and 42*b* for different media transport speeds. FIG. 10A shows timing for somewhat less than the full speed timing of FIG. 9. The duration of the encoder pulse 28 half-cycle is seven CLK cycles 40; this additional time compared to the six CLK cycles 40 of FIG. 9 indicates a slightly slower speed. The duration of first exposure pulse 42*a*, three CLK cycles 40 as shown, is given as a time t3. The duration of second exposure pulse 42*b*, also three CLK cycles 40 as shown, is given as a time t4. In the example given here, exposure pulses 42*a* and 42*b* are of the same duration as shown in FIG. 9 where the media in indicated to be at its highest speed.

Time intervals t3 and t4 are calculated based on the level of exposure energy needed to obtain the desired density for pixel 20, when limited to an acceptable amount of smear. In one embodiment, time intervals t3 and t4 are equal. As shown in FIGS. 10A and 10B, equal time intervals t3 and t4 provide the equivalent maximum density exposure, as was shown in FIG. 9. The resultant density profile 32 is similar to that shown subsequently in FIG. 11.

A first encoder pulse 28 begins at time t0; the second encoder pulse 28 begins at time t1. A time t5, four CLK cycles 40 as shown, is defined as the interval from the beginning of encoder pulse 28 for the pixel to the beginning of second exposure pulse 42*b*. Time t5 can be computed as follows:

$$t5 = ((t1-t0)/2) - t4'$$

FIG. 10B shows first and second exposure pulses 42*a* and 42*b* of equivalent duration to FIG. 10A; however, the number of CLK cycles 40 compared to encoder pulse 28 indicates relatively slow media transport speed in comparison with the FIG. 10A example. Corresponding encoder pulse timing t0' and t1' and timing intervals t3', t4', and t5' are indicated in FIG. 10B. It is significant to note that interval t3' is equal to t3, interval t4' is equal to t4. In addition, the leading edge position of t3' corresponds to that of t3, and the trailing edge position of t4' corresponds to the that of t4. Here, time t5' can be computed similarly:

$$t5' = ((t1'-t0')/2) - t4'$$

The use of two exposure pulses 42*a*, 42*b* is significant for obtaining the proper dimensions of pixel 20. Referring back to FIG. 3B, in the two-pulse modulation scheme of the present invention, the first exposure pulse 42*a* begins at leading edge 34 of pixel 20 and the second exposure pulse 42*b* ends at trailing edge 36.

Figure 3B:
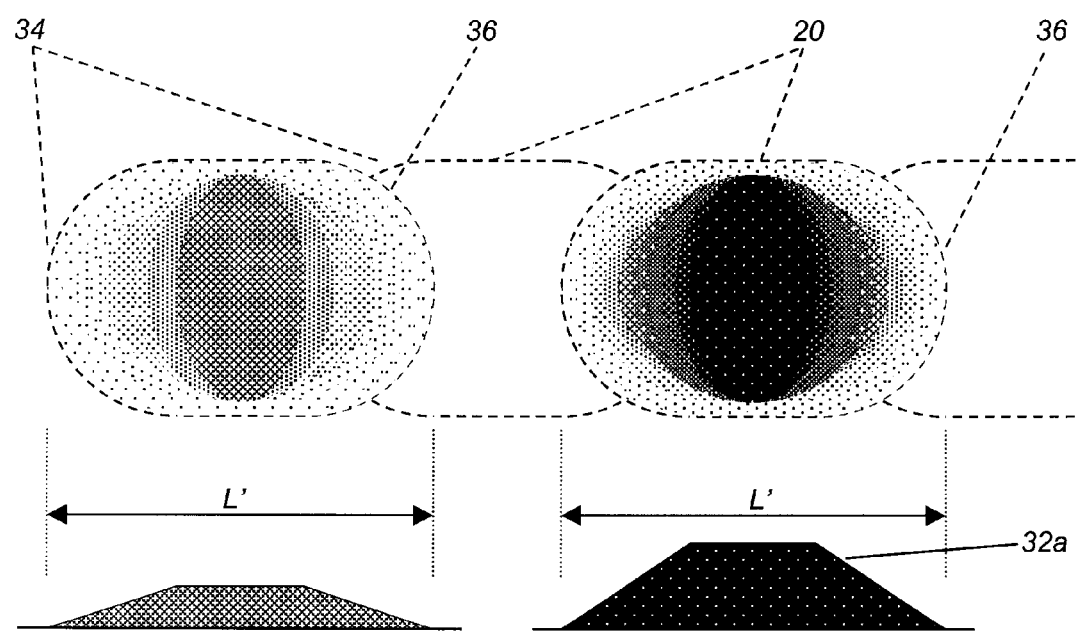
FIG. 3B is a top view of an array of pixels formed onto moving medium.
Figure 3C:
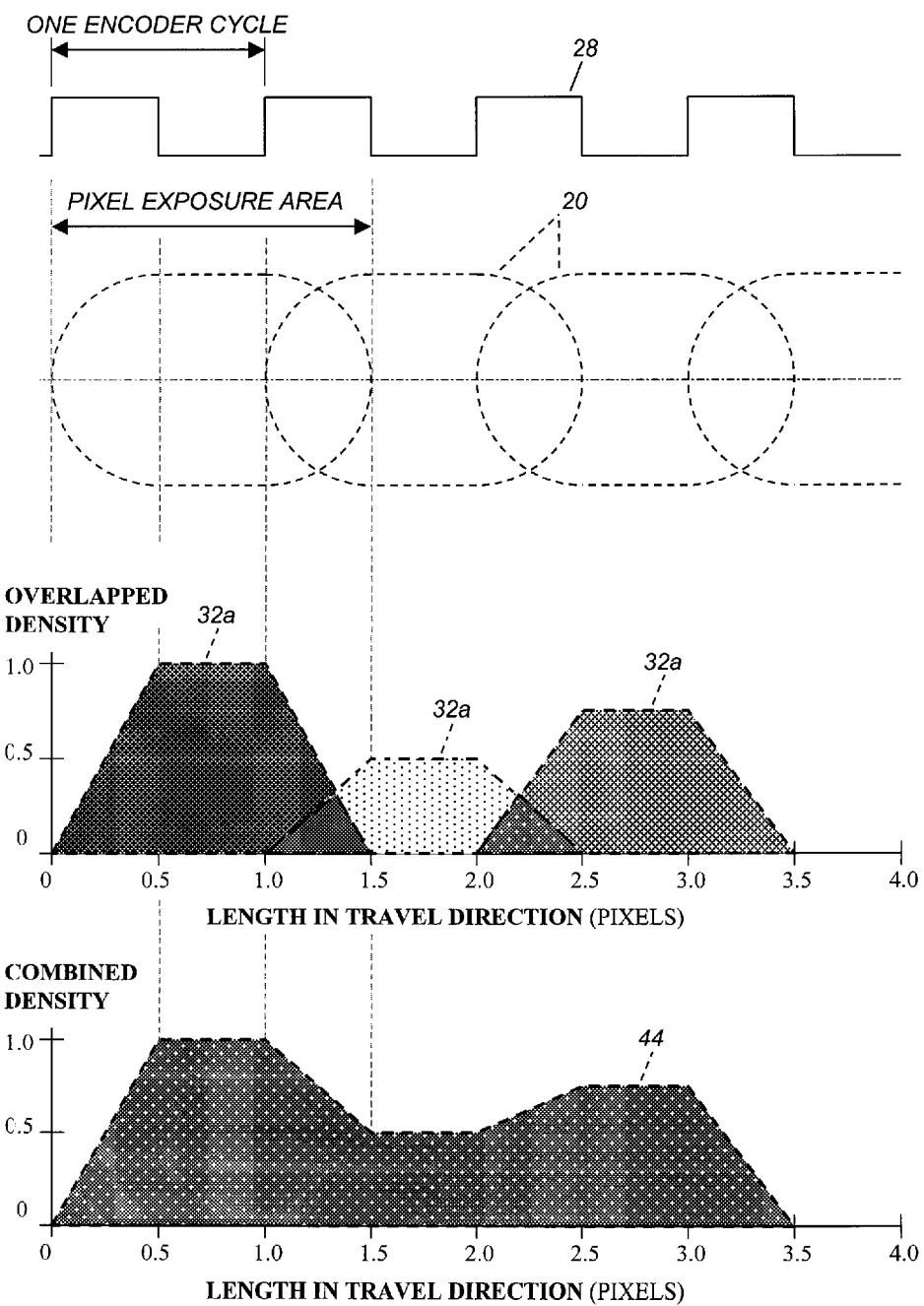
FIG. 3C is a graphical representation of pixel exposure area relative to timing and additive density due to pixel overlap.

It is worthwhile to observe that the calculation of time t5 gives an accurate estimate for coordinating the timing of exposure pulse 42*b* with the location of trailing edge 36 of pixel 20, as shown in FIG. 3B. This estimate, used to anticipate the time corresponding to trailing edge 36, is based on the latest available data on media transport speed, measured from preceding encoder pulses 28. As is well known to those skilled in the motion control arts, the media transport speed does not change instantaneously; even while accelerating, the estimate from recent data is sufficiently close for computing time t5 for accurate pixel 20 placement.

Varying the Density Level of Pixel 20

Figure 11:
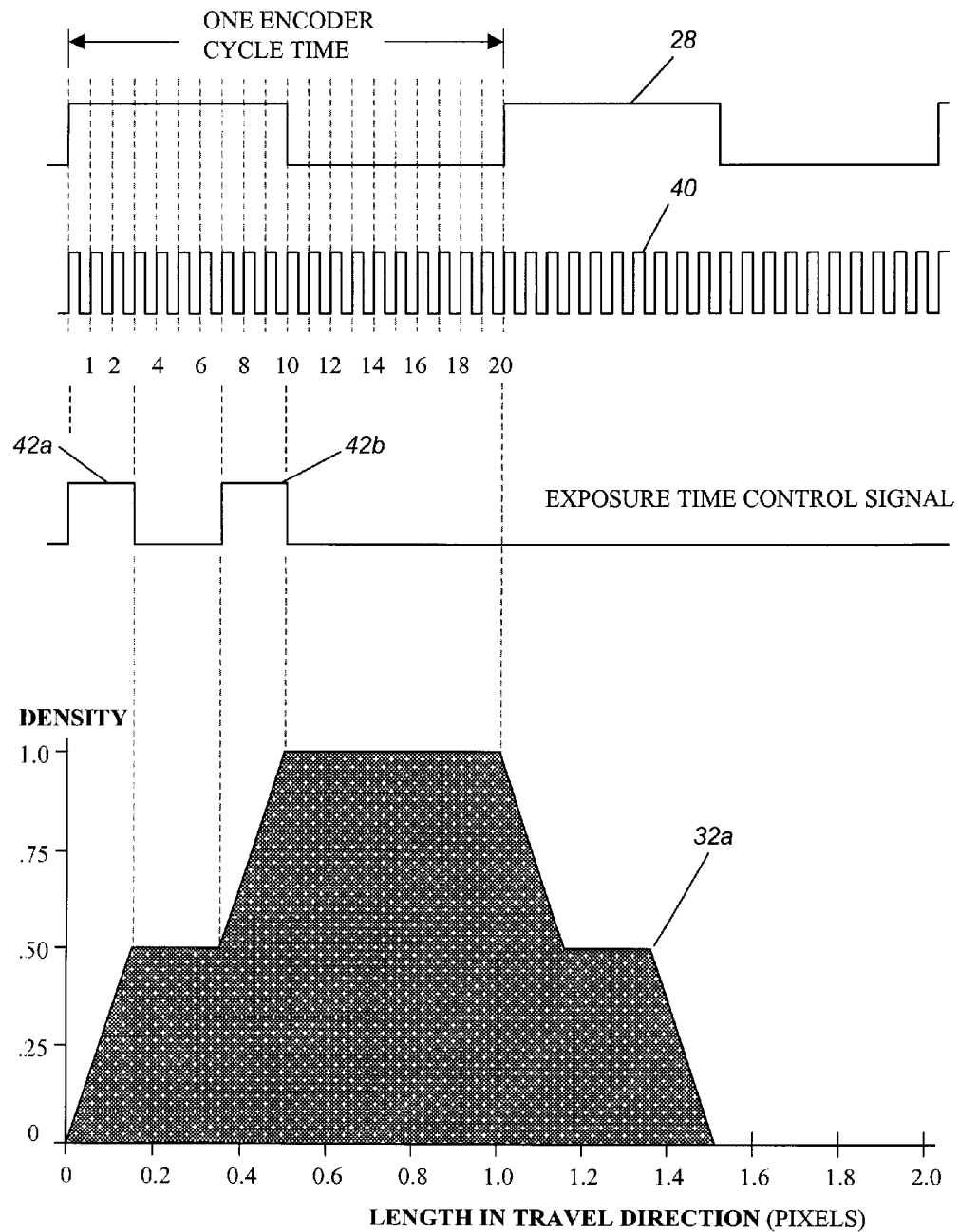
FIG. 11 is graph showing relative relationships of positioning, timing, and exposure signals for obtaining a desired density profile at an alternate speed.
Figure 12:
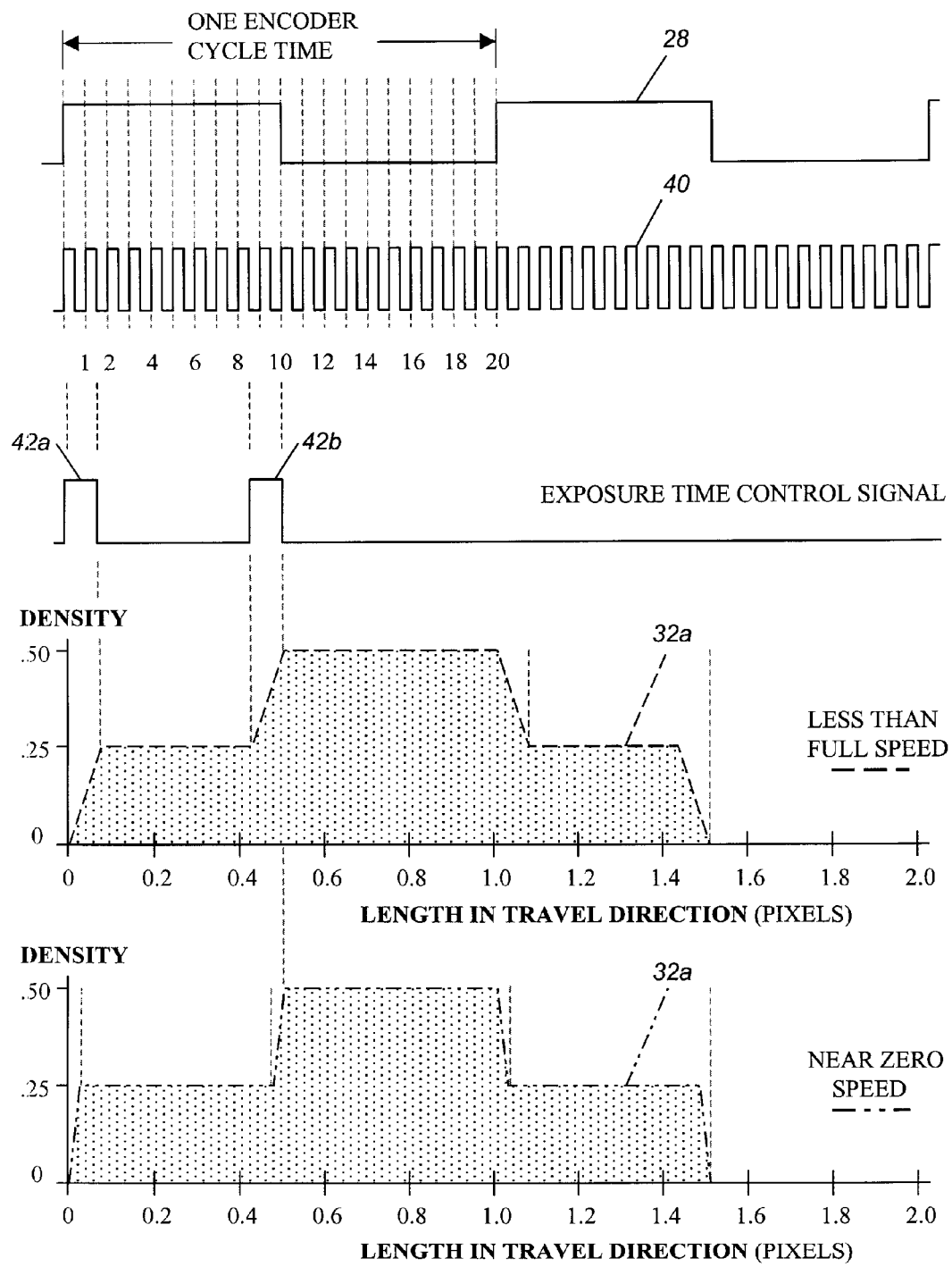
FIG. 12 is a graph showing driver timing for achieving a different density level according to the present invention.

Referring to FIGS. 11 and 12, there are shown key timing and spatial relationships for exposure energy effects of each exposure pulse 42*a*, 42*b* in forming density profile 32*a* where different media transport speeds are shown and different density levels are needed. As was shown with reference to FIG. 8, exposure pulses 42*a* and 42*b* are additive. Again, although exposure pulses 42*a* and 42*b* are separated in time, there is some overlap over part of the area of pixel 20. This overlap area receives twice the exposure energy, increasing the density obtained, to provide the required density profile 32*a*, such as is shown for a 1.0 density in FIG. 11 and for a 0.5 density in FIG. 12.

The example of FIG. 11 provides the same density as in FIGS. 8 through 10. Similar to FIG. 10A, with seven CLK cycle 40 pulses, or FIG. 10B, with nineteen CLK cycle 40 pulses, FIG. 11 has ten CLK cycle 40 pulses during the exposure period. Exposure pulses 42*a*, 42*b* are of the same duration and are separated appropriately for a speed that is less than the maximum. The 1.0 density maximum matches that achieved in FIGS. 8 and 9, but has a slightly different profile due to the slower media transport speed in FIG. 11. (Recall that both FIGS. 8 and 9 show behavior at maximum speed.) It is important to observe that density profile 32*a* in FIG. 11, extends over the same 1.5 pixel length as for the examples of FIGS. 8 and 9.

FIG. 12 shows how the practice of the present invention achieves a lesser density value at lower speeds. The media transport speed for FIG. 12 matches that of FIG. 11. In FIG. 12 the desired density needed is 50% or 0.5 normalized. In this case, first exposure pulse 42*a* begins at the time corresponding to leading edge 34 of pixel 20, as in previous examples, but is half of the duration of a full density pulse at full speed. Thus, here, the duration of each exposure pulse 42*a* and 42*b* is approximately 1.5 CLK cycle pulses 40. The stepped characteristic of density profile 32*a* in FIG. 12 approximates that of a full density profile at any speed, scaled to a lower density value. The length dimension of pixel 20 is maintained at 1.5 units, as used in the examples of FIGS. 8 through 11. As media transport speed decreases to near zero, the stepped characteristic of density profile 32a for pixel 20 having less than full density is less pronounced than for full density.

As FIGS. 11 and 12 show, changing the duration of exposure pulses 42a and 42b results in a different output density level. For the same density level at any speed, the duration of exposure pulses 42a and 42b is the same. The timing of exposure pulses 42a and 42b follows the same pattern, with first exposure pulse 42a beginning at the time corresponding to leading edge 34 of pixel 20 and with second exposure pulse 42b ending at the anticipated time calculated for trailing edge 36.

By coordinating the timing of first and second exposure pulses 42a and 42b with the timing of encoder pulses 28, the method of the present invention adapts the delivery of exposure energy to a variable transport speed for photosensitive medium 12. Further, by fitting both exposure pulses 42a and 42b appropriately within the time period available for forming pixel 20, the method of the present invention maintains the dimensional profile of pixel 20 over the range of possible transport speeds. In addition to providing the same density and general shape at varying transport speeds, the method of the present invention also allows the density itself to be varied over a range of discrete levels. For example, it can be advantageous to provide a watermark or other latent indicium having a density at one of 4 or 8 or 256 discrete values. For providing an image as the indicium, for example, it may be a requirement to provide at least 128 discrete density levels, preferably more.

Timing Control Circuitry

Figure 13:
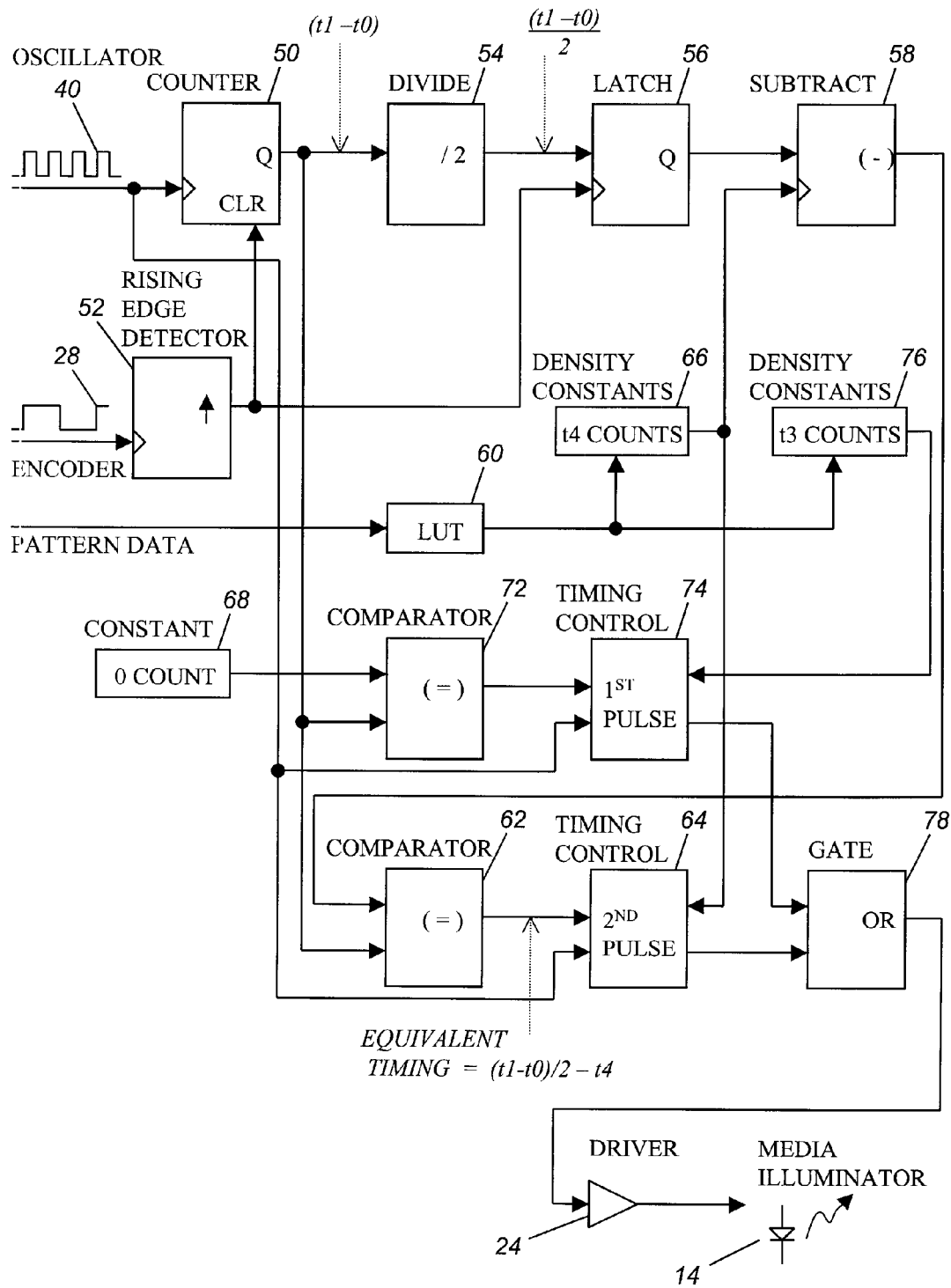
FIG. 13 is a functional block diagram of the logic and timing components for a pixel forming apparatus according to one embodiment.

Referring to FIG. 13, there is shown a functional schematic block diagram of the components used for timing control of pixel exposure source 14 in one embodiment. This same component arrangement would be used for each individual pixel driver circuit, timing both first exposure pulse 42a of duration t3 and second exposure pulse 42b of duration t4 for each pixel 20.

A counter 50 maintains a count of fixed frequency high-speed reference clock CLK cycles 40 that are gated by encoder pulse 28, using, as a reset, a rising edge detection circuit 52 for each pixel 20. At reset, a comparator 72 signals that a constant 68 has been satisfied and a timing control 74 circuit uses CLK cycles 40 to generate exposure pulse 42a for a duration appropriate for a density constant 76 corresponding to time interval t3. The specific duration is determined by processing indicia pattern data using a look up table (LUT) 60. LUT 60 yields a predetermined value of counts of CLK cycles 40 needed to provide the necessary exposure interval for obtaining the desired density for pixel 20. This first pulse is directed to gate 78 for controlling driver 24 for pixel exposure source 14.

Similarly, counter 50 uses the count of the fixed frequency high-speed reference clock cycles 40 CLK to generate second exposure pulse 42b. With this parallel arrangement, the output of counter 50 effectively yields the (t1−t0) value described above with reference to FIG. 10A. A divider 54 performs division by 2 and provides the resulting signal to a latch 56. Latch 56 is gated off the rising edge of encoder pulse 28, thereby storing the time duration of half of the preceding cycle as a predictive value for timing second exposure pulse 42b in this cycle. A subtractor 58 obtains a density constant 66 for interval t4. Subtractor 58 provides a stable value to comparator 62 for determining the timing interval t5 for delay of second exposure pulse 42b. A comparator 62 receives the present counter 50 value giving the amount of time since the beginning of the encoder cycle 28. When comparator 62 indicates equivalency, the time t5 has been reached. Comparator 62 output goes to a timing control component 64 which utilizes the t4 count of CLK cycles to send second exposure pulse 42b through the same gated path to controlling driver 24 for pixel exposure source 14.

The apparatus and method of the present invention thus provide a way to maintain the length dimension as well as overall density of each pixel 20 on photosensitive media 12 over the range of possible media transport speeds. Thus, for example, pixel 20 size and overall appearance are similar for pixels 20 written during ramp-up, during ramp-down, or during full speed operation. This means that the method and apparatus of the present invention are particularly well-suited for forming latent indicia on the media during manufacture. This method would have advantages in a manufacturing environment for film and other types of photographic media, for example, with possible application to other types of recording media, such as thermal and magnetic recording media, for example. In the most general case, pixel exposure source 14 applies some type of pixel-forming energy onto a sensitized medium, where the energy may be in the form of light, heat, or magnetic flux density, for example.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the control circuitry used could be embodied using a number of different designs, including the use of a programmable gate array or similar encoded device. While the embodiments described above use a pair of exposure pulses 42a and 42b, the use of more than two pulses is possible, provided that the first pulse for a pixel begins at the leading edge position for the pixel and that the last pulse for the pixel end at the trailing edge position, so that pixel 20 has the desired dimensions. The use of more than two exposure pulses 42a, 42b could have a beneficial smoothing effect at the highest densities in some applications. However, at high media transport speeds, response characteristics of a sensitized medium may exhibit "reciprocity failure" familiar to those skilled in the photographic sciences, so that a photosensitive film would not have a linear, additive response to short pulses of exposure. Thus, for most media and transport speeds, the use of two exposure pulses 42a and 42b proves to be more advantageous than the use of more than two pulses. Exposure pulses 42a, 42b need not have equal duration as shown in the embodiments given above; however, it can be appreciated that this arrangement may simplify calculation and processing.

Pixel recording apparatus 30 as shown in FIG. 4 can take a variety of forms. The timing sequence for pulse-width modulation of two or more exposure pulses 42a and 42b admits a number of options and variations from that described with reference to FIGS. 7–12. For example, the energy of the first pulse may be different from the energy of the second pulse.

As was noted with reference to FIGS. 9 through 12, the timing pattern used for the described embodiment employs a convenient synchronization arrangement in which a half-cycle of a single encoder pulse 28 corresponds to the spatial position of a single pixel 20. Alternately, a different synchronization scheme could be used, with the spatial position of a single pixel 20 corresponding to some multiple or fraction of encoder pulse 28 cycles.

Thus, what is provided is an apparatus and method for recording pixels onto a sensitized recording medium that is moving at a variable rate, wherein pixel dimensions are maintained regardless of media transport speed.

PARTS LIST

10 pixel
12 photosensitive medium
14 pixel exposure source
16 media transport apparatus
18 encoder
20 pixel
22 control logic processor
24 driver
26 roll
28 encoder pulse
30 pixel recording apparatus
32 density profile
32a density profile
32c density profile
32d density profile
34 leading edge
36 trailing edge
40 clock cycle
42 exposure pulse
42a exposure pulse
42b exposure pulse
44 additive density profile
50 counter
52 rising edge detection circuit
54 divider
56 latch
58 subtractor
60 look up table (LUT)
62 comparator
64 timing control component
66 density constant
68 constant
72 comparator
74 timing control component
76 density constant
78 gate

The invention claimed is:

1. A method for forming a pixel having a predetermined density onto a sensitized recording medium moving in a length direction comprising:
   (a) energizing a pixel exposure source to begin exposure at a leading edge of a pixel and for a first predetermined time interval;
   (b) de-energizing the pixel exposure source for a period depending on the predetermined density and on media transport speed;
   (c) re-energizing the pixel exposure source at a termination of the period;
   (d) de-energizing the pixel exposure source at an end of a second predetermined time interval to terminate exposure substantially at a trailing edge of the pixel; and
   such that steps (a)–(d) are executed in sequence over the length of a single pixel.

2. A method according to claim 1 wherein the step of energizing a pixel source comprises the step of energizing an LED.

3. A method according to claim 1 wherein the period is determined by the steps of:
   (a) measuring a positional time interval between a first positional signal at time t0 and a second positional signal at time t1, wherein times t0 and t1 relate to positions on the moving medium;
   (b) calculating an exposure time interval as fraction of the positional time interval during which the pixel is exposed, (t1−t0)/n, wherein n is an integer greater than one; and
   calculating the time for re-energizing the pixel source by subtracting the second predetermined time interval from the exposure time interval.

4. A method according to claim 1 wherein the first and second predetermined time intervals are substantially equal.

5. A method as in claim 1 wherein the pixel exposure source is energized at a first energy level for the first predetermined time interval and at a second energy level for the second predetermined timed interval.

6. A method for forming a pixel having a predetermined density onto a recording medium moving in a length direction comprising:
   (a) energizing a pixel energy source to begin applying pixel-forming energy at a leading edge of a pixel and for a predetermined first time interval;
   (b) de-energizing the pixel energy source for a period depending on the predetermined density and on media transport speed;
   (c) re-energizing the pixel energy source at a termination of the period;
   (d) de-energizing the pixel energy source to terminate applying pixel-forming energy at a trailing edge of the pixel; and
   such that steps (a)–(d) are executed in sequence over the length of a single pixel.

7. A method according to claim 6 wherein the pixel energy source provides thermal energy.

8. A method according to claim 6 wherein the pixel energy source provides light energy.

9. A method according to claim 6 wherein the pixel energy source provides magnetic flux density.

* * * * *